US006802931B2

(12) United States Patent
Fujihira

(10) Patent No.: US 6,802,931 B2
(45) Date of Patent: *Oct. 12, 2004

(54) METHOD FOR PRODUCING COMPOSITE STRUCTURE

(75) Inventor: Toru Fujihira, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 272 days.

This patent is subject to a terminal disclaimer.

(21) Appl. No.: 09/832,794

(22) Filed: Apr. 12, 2001

(65) Prior Publication Data
US 2001/0030380 A1 Oct. 18, 2001

(30) Foreign Application Priority Data

Apr. 14, 2000 (JP) ........................................ 2000-113439

(51) Int. Cl.[7] ............................................. B32B 31/20
(52) U.S. Cl. ...................... 156/292; 156/242; 156/323; 264/258; 264/319
(58) Field of Search ................................. 156/242, 292, 156/297, 285, 323; 244/125, 123, 124, 126; 428/116; 264/319, 258

(56) References Cited

U.S. PATENT DOCUMENTS

| 4,416,349 A | 11/1983 | Jacobs |
| 5,242,523 A | 9/1993 | Willden et al. |
| 5,580,502 A | 12/1996 | Forster et al. |
| 6,197,146 B1 * | 3/2001 | Sucic et al. ................. 156/245 |
| 6,523,246 B1 * | 2/2003 | Matsui et al. ................. 29/559 |
| 6,551,441 B1 * | 4/2003 | Sato et al. ................... 156/323 |
| 2003/0190452 A1 * | 10/2003 | Lucas et al. ................. 428/116 |

FOREIGN PATENT DOCUMENTS

| EP | 0 650 825 A1 | 5/1995 | |
| FR | 2 771 330 A1 | 5/1999 | |
| JP | 57-116635 * | 7/1982 | ............ B32B/3/12 |
| WO | WO 99-39976 * | 8/1999 | ............ B64C/1/12 |

OTHER PUBLICATIONS

Patent Abstracts of Japan, JP 05 008316, Jan. 19, 1993.
European Search Report for EP 01 30 3507.

* cited by examiner

Primary Examiner—Jeff H. Aftergut
Assistant Examiner—Jessica L. Rossi
(74) Attorney, Agent, or Firm—Sughrue Mion, PLLC

(57) ABSTRACT

A method for producing a composite structure having a three-dimensionally curved portion and a cylindrical portion, comprising the steps of: (a) placing an outer skin made of a composite prepreg on a forming die; (b) mounting a honeycomb core on a portion of the outer skin that forms the three-dimensionally curved portion; (c) superimposing an inner skin made of a composite prepreg thereon; (d) arranging a preformed frame member and a preformed stringer member each made of a composite prepreg on a portion of the inner skin that forms the cylindrical portion to prepare an assembly; and (e) forming the assembly by heating under a pressure. A composite structure of the present invention can be produced by the method.

4 Claims, 7 Drawing Sheets

(a)

(b)

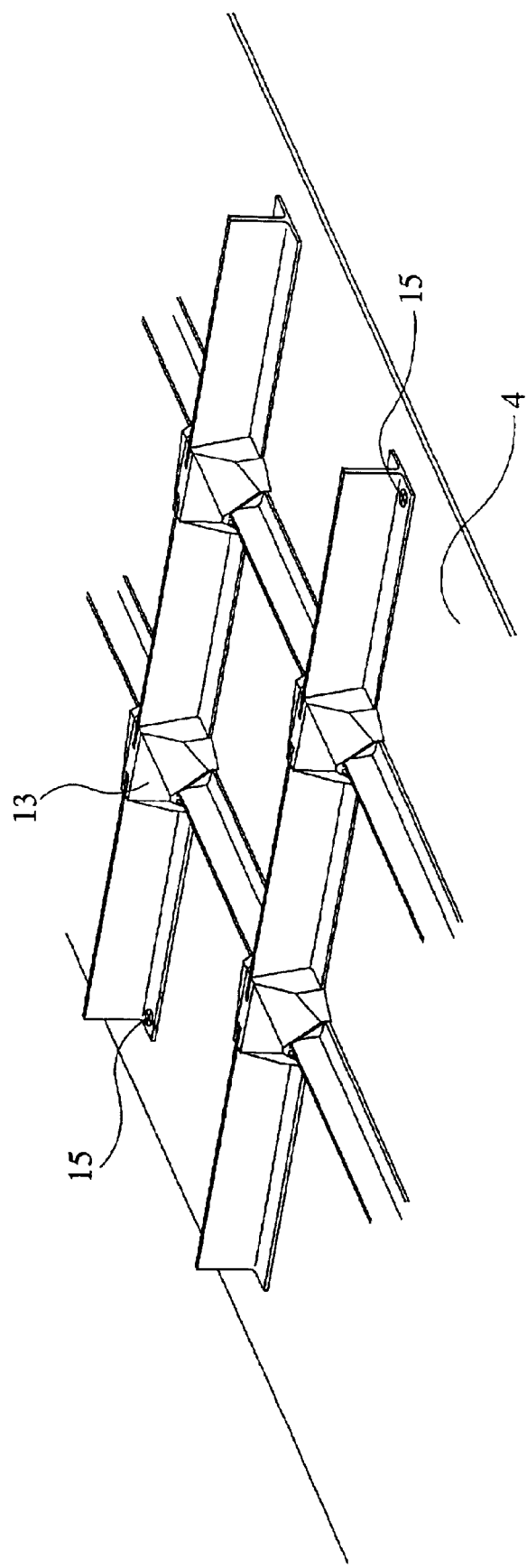

METHOD FOR PRODUCING COMPOSITE STRUCTURE

BACKGROUND OF THE INVENTION

The present invention relates to a method for producing a composite structure having a three-dimensionally curved portion and a cylindrical portion, and to a composite structure produced thereby.

Composite prepregs are light in weight and high in strength, so that they have been widely used as a material for automobiles, ships, aircrafts, etc. Aircrafts using the composite prepreg generally contain a composite structure having a three-dimensionally curved portion and a cylindrical portion. Such a composite structure is usually composed of a honeycomb sandwich panel or a stiffened panel.

The composite structures composed of a honeycomb sandwich panel are produced by the steps of: cutting a honeycomb material into a desired shape to obtain a honeycomb core; laminating the honeycomb core with skins made of a composite prepreg on a forming die in a sandwich form to prepare an assembly; and forming the assembly by heating under a pressure. Thus, the composite structures composed of a honeycomb sandwich panel can be produced by relatively simple processes with reduced production cost. However, such composite structures are often disadvantageous in that sufficient weight-reducing effect is not achieved.

On the other hand, the composite structures composed of a stiffened panel are produced by the steps of: laminating skins and stiffeners (stringers and frames) each made of composite prepregs on a forming die to prepare an assembly; and forming the assembly by heating under a pressure using a pressure bag, etc. The stiffened panels, particularly such that the skins and the stiffeners are integrally formed, are superior in weight-reducing effect to the honeycomb sandwich panels. However, in the case where the stiffened panel is produced by integrally forming the skins and the stiffeners, the stiffeners are preformed and then integrated with the skins while using a jig on the die, thereby increasing production cost. In particular, when the stiffened panels are used for the three-dimensionally curved portions, the production cost is remarkably increased.

OBJECT AND SUMMARY OF THE INVENTION

An object of the present invention is to provide a method for producing a sufficiently lightweight composite structure having a three-dimensionally curved portion and a cylindrical portion with reduced production cost, and a composite structure produced by the method.

As a result of intensive research in view of the above object, the inventor has found that a sufficiently lightweight composite structure having a three-dimensionally curved portion and a cylindrical portion can be produced with reduced production cost by forming the three-dimensionally curved portion composed of a honeycomb sandwich panel and the cylindrical portion composed of a stiffened panel at the same time. The present invention has been accomplished by the finding.

Thus, a method of the present invention for producing a composite structure having a three-dimensionally curved portion and a cylindrical portion comprises the steps of: (a) placing an outer skin made of a composite prepreg on a forming die; (b) mounting a honeycomb core on a portion of the outer skin that forms the three-dimensionally curved portion; (c) superimposing an inner skin made of a composite prepreg thereon; (d) arranging a preformed frame member and a preformed stringer member each made of a composite prepreg on a portion of the inner skin that forms the cylindrical portion to prepare an assembly; and (e) forming the assembly by heating under a pressure.

The honeycomb sandwich panel is generally formed under a pressure of approximately 3 kg/cm$^2$, and the stiffened panel is generally formed under a pressure of approximately 6 kg/cm$^2$. Conventionally, when the honeycomb sandwich panel and the stiffened panel are formed at the same time under a pressure of 3 kg/cm$^2$, the stiffened panel is deteriorated in its quality. On the other hand, when they are formed at the same time under a pressure of 6 kg/cm$^2$, an edge portion of a honeycomb core contained in the honeycomb sandwich panel is often unable to withstand the pressure, resulting in deformation (crush) thereof.

Therefore, in the present invention, the above assembly is preferably formed by heating under a pressure while disposing an elastic plate and a press plate on a fin portion where the outer skin and the inner skin overlap each other, to prevent the crush of the honeycomb core. Also, a fin portion having a width of 500 mm or more can sufficiently prevent the crush of the honeycomb core without the elastic plate and the press plate. Thus, in this invention, the honeycomb sandwich panel and the stiffened panel can be formed at the same time under a pressure of approximately 6 kg/cm$^2$ without the crush of the honeycomb core and insufficient forming. The pressure is preferably 6 to 7 kg/cm$^2$.

A plurality of the preformed frame members may be linearly arranged at an interval on the portion of the inner skin that forms the cylindrical portion, one or more of the preformed stringer member passing through the interval and intersecting the preformed frame members. In this case, it is preferable that the assembly is formed by heating while using a forming jig comprising a combination of an elastic jig engageable with the intersection of the preformed frame members and the preformed stringer member, and rigid jigs attachable to the members in portions other than the intersection.

The method of the present invention can be suitably used for producing an aircraft body. Further, a composite structure of the present invention is obtainable by the method.

BRIEF DESCRIPTION OF THE DRAWINGS

FIG. 8 is a fragmentary perspective view showing a state of fixing preformed stringer members and preformed frame members onto an inner skin by fixing means.

DETAILED DESCRIPTION OF THE PREFERRED EMBODIMENTS

A method of the present invention for producing a composite structure having a three-dimensionally curved portion and a cylindrical portion comprises the steps of: (a) placing an outer skin made of a composite prepreg on a forming die; (b) mounting a honeycomb core on a portion of the outer skin that forms the three-dimensionally curved portion; (c) superimposing an inner skin made of a composite prepreg thereon; (d) arranging a preformed frame member and a preformed stringer member each made of a composite prepreg on a portion of the inner skin that forms the cylindrical portion to prepare an assembly; and (e) forming the assembly by heating under a pressure. A composite structure of the present invention is obtainable by this method. The present invention will be explained in detail below with reference to FIGS. 1 to 8.

Figure 1:
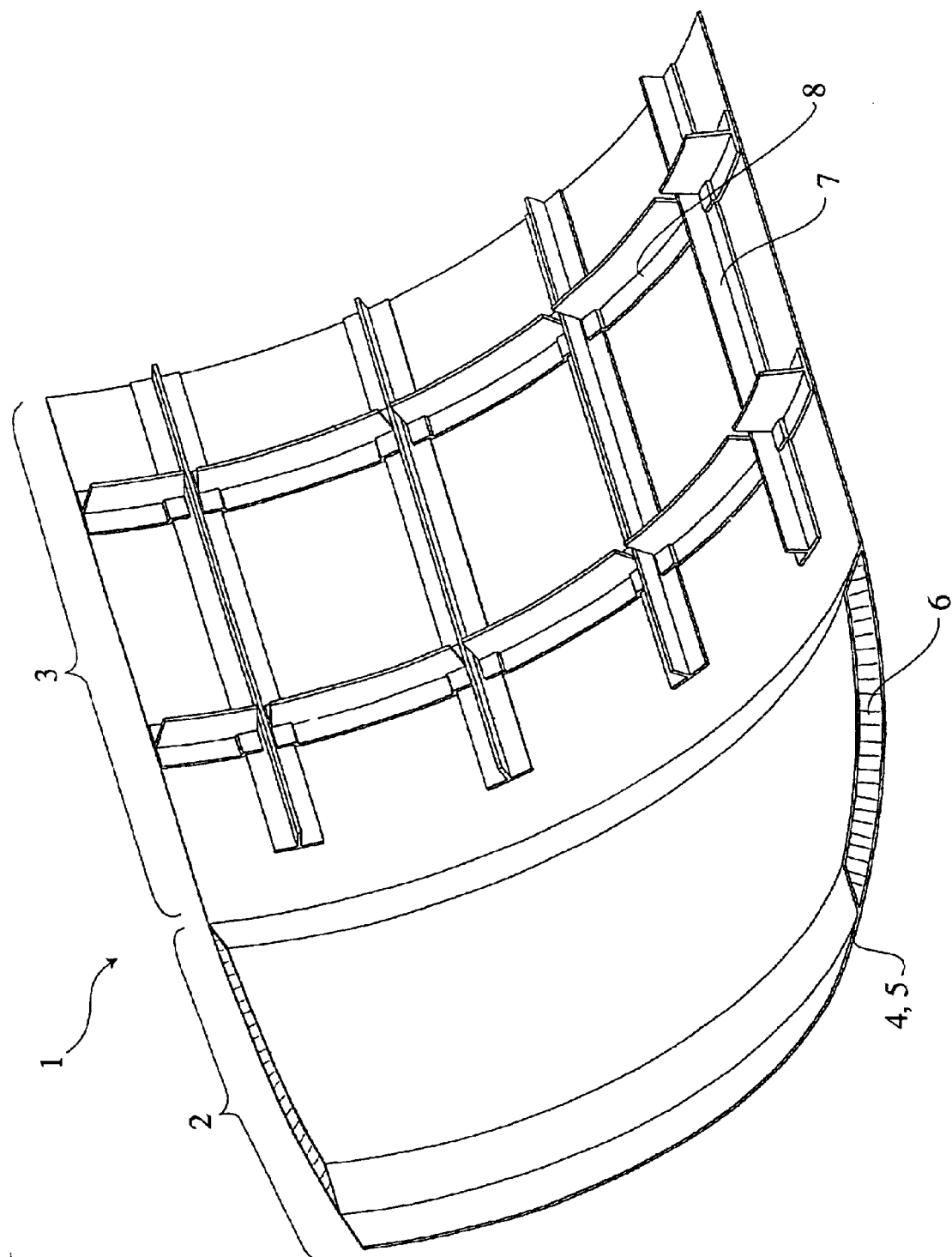
FIG. 1 is a fragmentary perspective view showing an example of a composite structure according to the present invention.

FIG. 1 is a fragmentary perspective view showing an example of a composite structure according to the present invention. A composite structure 1 according to the present invention has a three-dimensionally curved portion 2 and a cylindrical portion 3. The three-dimensionally curved portion 2 is composed of a honeycomb sandwich panel containing a honeycomb core 6 between an outer skin 4 and an inner skin 5, and the cylindrical portion 3 is composed of a stiffened panel containing stringers 7 and frames 8. Each of the outer skin 4, the inner skin 5, the stringers 7 and the frames 8 is made of a composite prepreg. The shape of the three-dimensionally curved portion and the cylindrical portion is not limited by FIG. 1. The composite structure may have such a portion as a flat plate-shaped portion, etc. other than the three-dimensionally curved portion and the cylindrical portion, so that a complicated shaped portion is composed of the honeycomb sandwich panel and a simple shaped portion is composed of the stiffened panel in the present invention.

Figure 2:
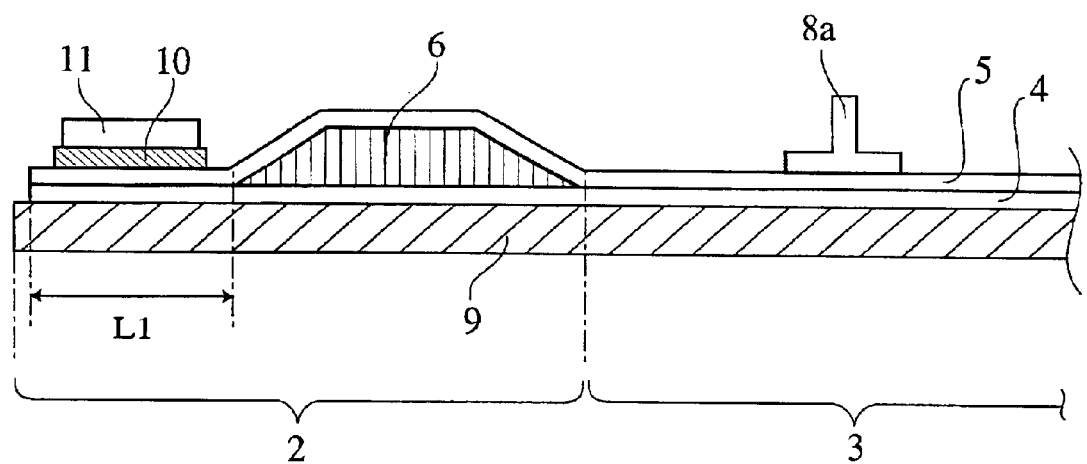
FIG. 2 is a fragmentary sectional view showing an embodiment of a method for producing composite structure according to the present invention.

FIG. 2 is a fragmentary sectional view showing an embodiment of the method for producing a composite structure according to the present invention. In FIG. 2, all elements are simply illustrated by straight lines, however, the present invention is not limited thereby. In the present invention, an outer skin 4 made of a composite prepreg is placed on a forming die, then, a honeycomb core 6 is mounted on a portion of the outer skin 4 that forms the three-dimensionally curved portion 2, and an inner skin 5 made of a composite prepreg is superimposed thereon. A preformed frame member 8a and a preformed stringer member (not shown in FIG. 2) each made of a composite prepreg is arranged on a portion of the inner skin 5 that forms the cylindrical portion 3 to prepare an assembly. Subsequently, three-dimensionally curved portion 2 and the cylindrical portion 3 of the assembly are concurrently formed by heating under a pressure to produce the composite structure. An adhesive may be applied between each of the elements if necessary, and a vacuum bag, a sealing agent, etc. may be used in forming.

In the present invention, a thermosetting resin or a thermoplastic resin contained in the composite prepreg is fluidized by heating under pressure to integrally form the outer skin 4, the inner skin 5, the preformed frame member 8a and the preformed stringer member. It is particularly preferred that the assembly is formed by heating under a pressure while disposing an elastic plate 10 and a press plate 11 on a fin portion where the outer skin 4 and the inner skin 5 overlap each other as shown in FIG. 2. As a result, the slipping of the skins is suppressed by friction enhanced by the applied pressure and the edge effect of the press plate, to prevent the crush of the honeycomb core 6 even in the case of the high applied pressure, for example, 6 kg/cm$^2$. Also, when the width L1 of the fin portion is 500 mm or more, the honeycomb core 6 is sufficiently prevented from crushing without the elastic plate 10 and the press plate 11.

The forming pressure employed in the present invention is preferably 5 to 7 kg/cm$^2$, more preferably 6 to 7 kg/cm$^2$. According to the present invention, the honeycomb sandwich panel and the stiffened panel can be concurrently formed under a higher pressure than that according to conventional methods where the honeycomb sandwich panel is formed under a pressure of usually 3 to 4 kg/cm$^2$, resulting in no insufficient forming due to pressure shortage. Although the heating temperature may be selected depending on the kind of the thermosetting resin or the thermoplastic resin contained in the composite prepreg, the heating temperature is preferably 120 to 250° C. in general.

To form the stringers and frames with high shape and position accuracy, the assembly may be formed by heating while using a forming jig. In the present invention, a plurality of the preformed frame members may be linearly arranged at an interval on the portion of the inner skin that forms the cylindrical portion, one or more of the preformed stringer member passing through the interval and intersecting the preformed frame members. In this case, it is preferable that the assembly is formed by heating while using a forming jig comprising a combination of an elastic jig engageable with the intersection of the preformed frame members and the preformed stringer member, and rigid jigs attachable to the members in portions other than the intersection. The use of such a forming jig makes it possible to integrally form the stiffened panel, particularly such that has a simple shape, at lower cost.

The method for producing a composite structure according to the present invention is suited for the production of body structures of automobiles, vessels, aircrafts, etc., particularly aircraft bodies having a cabin corresponding to the above-mentioned cylindrical portion and a cockpit corresponding to the above-mentioned three-dimensionally curved portion. Thus, the cabin having a simple shape is composed of the integrally formed stiffened panel to reduce the weight of the aircraft body, and the cockpit is composed of the honeycomb sandwich panel to decrease production cost.

Respective elements of the present invention will be described in more detail below.

[1] Forming Die

Figure 3:
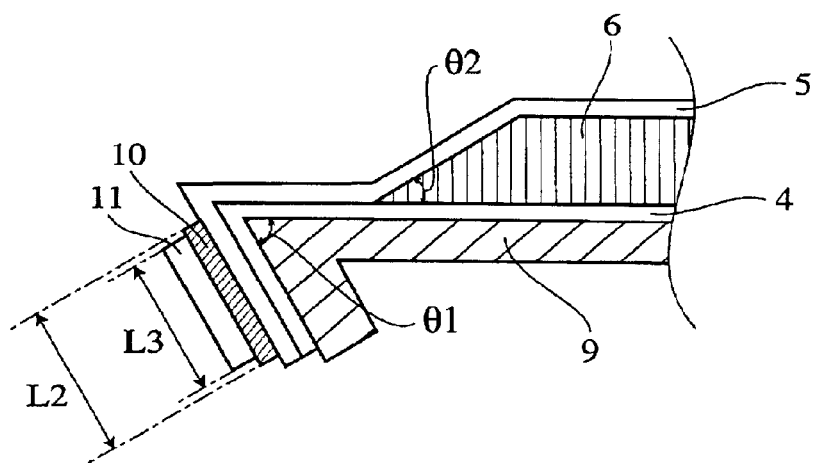
FIG. 3 is a fragmentary sectional view showing another embodiment of a method for producing composite structure according to the present invention.

The forming die used in the present invention may be made of a metal, a carbon fiber-reinforced plastic, etc. As shown in FIG. 3, the forming die 9 may have a forming surface which the honeycomb core is mounted on, and an edge surface which the elastic plate 10 and the press plate 11 are disposed on. An angle θ1 between the forming surface and the edge surface is preferably 30 to 180°. The angle θ1 is particularly preferably 45 to 90° (60° in FIG. 3), to sufficiently prevent the skins from slipping even in the case where the widths L2 and L3 of the elastic plate 10 and the press plate 11 are made smaller.

[2] Outer Skin and Inner Skin

The outer skin and the inner skin are each made of such a composite prepreg that may be a woven fabric of a reinforcing fiber such as a carbon fiber, a glass fiber, an aramid fiber, etc., impregnated with a thermosetting resin or a thermoplastic resin. Preferred as the thermosetting resin is an epoxy resin, and preferred as the thermoplastic resin is a nylon. The outer skin and the inner skin are preferably made of the same material, although they may be made of the different materials.

[3] Honeycomb Core

The honeycomb core used in the present invention may be made of a paper, a paper impregnated with a resin, a plastic, aluminum, a steel, etc. Among them, an aramid fiber-reinforced thermosetting resin having high specific strength is preferably used for the honeycomb core, and in this case, the thermosetting resin is preferably a phenolic resin.

The honeycomb core preferably has a tapered portion provided by chamfering. In FIG. 3, the honeycomb core edge angle θ2 may be 30 to 90°, preferably 30 to 45° to sufficiently prevent the honeycomb core from crushing. In the method of the present invention, the honeycomb core edge angle can be made larger than those in conventional methods, usually 30° or less, so that the tapered portion being a dead space can be made small, to design the composite structure in a various shape.

[4] Preformed Stringer Member and Preformed Frame Member

Figure 4:
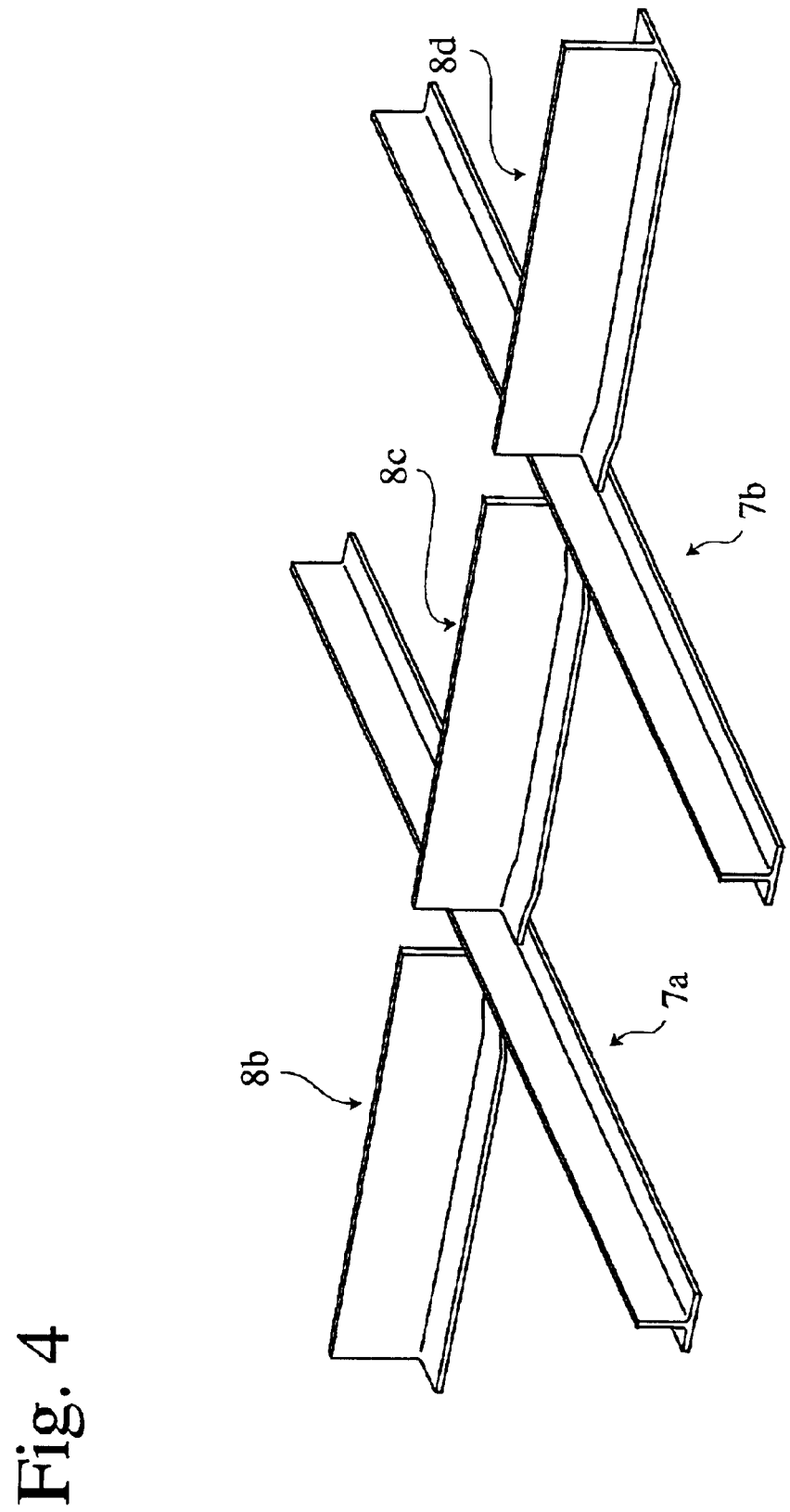
FIG. 4 is a perspective view showing an embodiment of arranging preformed frame members and preformed stringer members on an inner skin in a method for producing composite structure according to the present invention.

There is no particular limitation on the shape of the preformed stringer member and the preformed frame member, and they may be T-shaped as shown in FIG. 2, or C-shaped, J-shaped, etc. Further, the number and the positional relationship of the preformed stringer member and the preformed frame member arranged on the inner skin are also not particularly limited, may be such as shown in FIG. 4. In FIG. 4, preformed frame members 8b, 8c and 8d each having a base portion and a projecting portion are linearly arranged at an interval, and preformed stringer members 7a and 7b each having a base portion and a projecting portion pass through the interval and intersect the preformed frame members 8b, 8c and 8d. Each base portion of the preformed frame members 8b, 8c and 8d partially has a step.

The preformed stringer member and the preformed frame member may be each preliminarily formed by laminating a plurality of composite prepregs, and by making a resin contained therein react or weld with each other. Each composite prepregs used for the preformed stringer member and the preformed frame member is preferably such a woven fabric of a reinforcing fiber such as a carbon fiber, a glass fiber, an aramid fiber, etc. that is impregnated with a thermosetting resin or a thermoplastic resin. The thermosetting resin is preferably an epoxy resin, and the thermoplastic resin is preferably a nylon. The preformed stringer member and the preformed frame member are preferably made of the same material, although they may be made of the different materials. Further, it is particularly preferred that the preformed stringer member, the preformed frame member, the outer skin and the inner skin are made of the same material. The preformed stringer member and the preformed frame member are preferably arranged on the inner skin in a semi-hardened state.

[5] Elastic Plate and Press Plate

Figure 5:
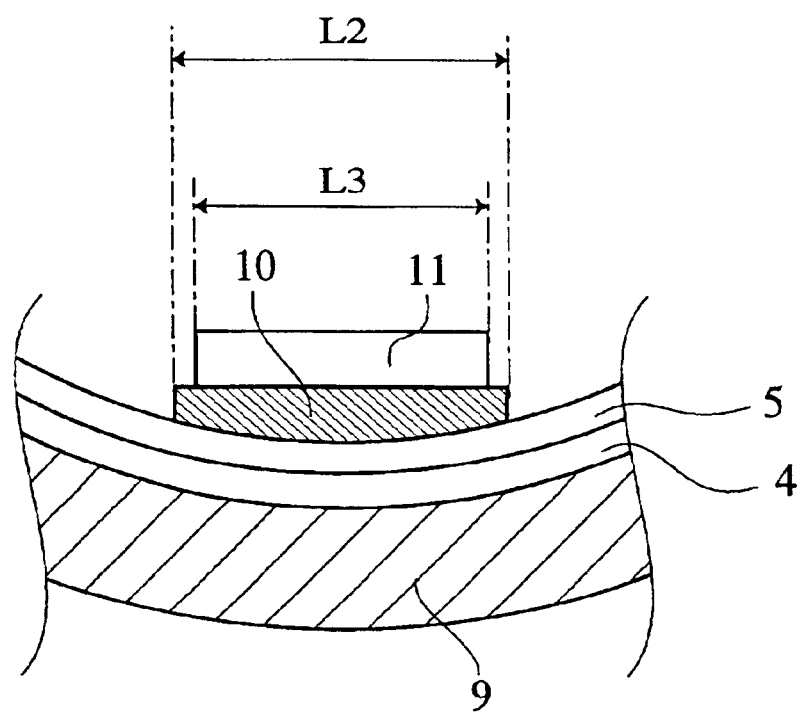
FIG. 5 is a fragmentary sectional view showing an elastic plate and a press plate in the case of using a forming die having a curved surface in a method for producing composite structure according to the present invention.

The elastic plate and the press plate used in the present invention may have a simple flat plate shape, independently of the shape of the forming die. As shown in FIG. 5, even when the forming die 9 has a curved shape, the use of the elastic plate 10 allows the applied pressure to be uniformly transmitted to the skins, owing to the elasticity thereof.

In FIG. 5, the width L2 of the elastic plate 10 and the width L3 of the press plate 11 may each be 40 mm or more for sufficient prevention of the crush of the honeycomb core and are preferably 40 to 250 mm for practical application. Each of the elastic plate and the press plate has a thickness of preferably 0.3 to 2 mm, more preferably 0.5 to 1 mm. When the thickness is less than 0.3 mm, the crush of the honeycomb core is not sufficiently prevented. On the other hand, when the thickness is more than 2 mm, the plates often do not match the shape of the forming die. Thus, the elastic plate and the press plate used in the present invention are very thin, so that they neither become obstacle in applying a vacuum bag nor break the vacuum bag.

The elastic plate is preferably made of an elastomer having flexibility and heat resistance, more preferably made of a silicone rubber. The press plate is preferably made of a material excellent in strength and rigidity and low in thermal expansion. As such a material, there can be mentioned metals such as a steel, a stainless steel and aluminum; graphite; carbon fiber-reinforced plastics, etc. Among them, aluminum is particularly preferred.

[6] Forming Jig

Figure 6:
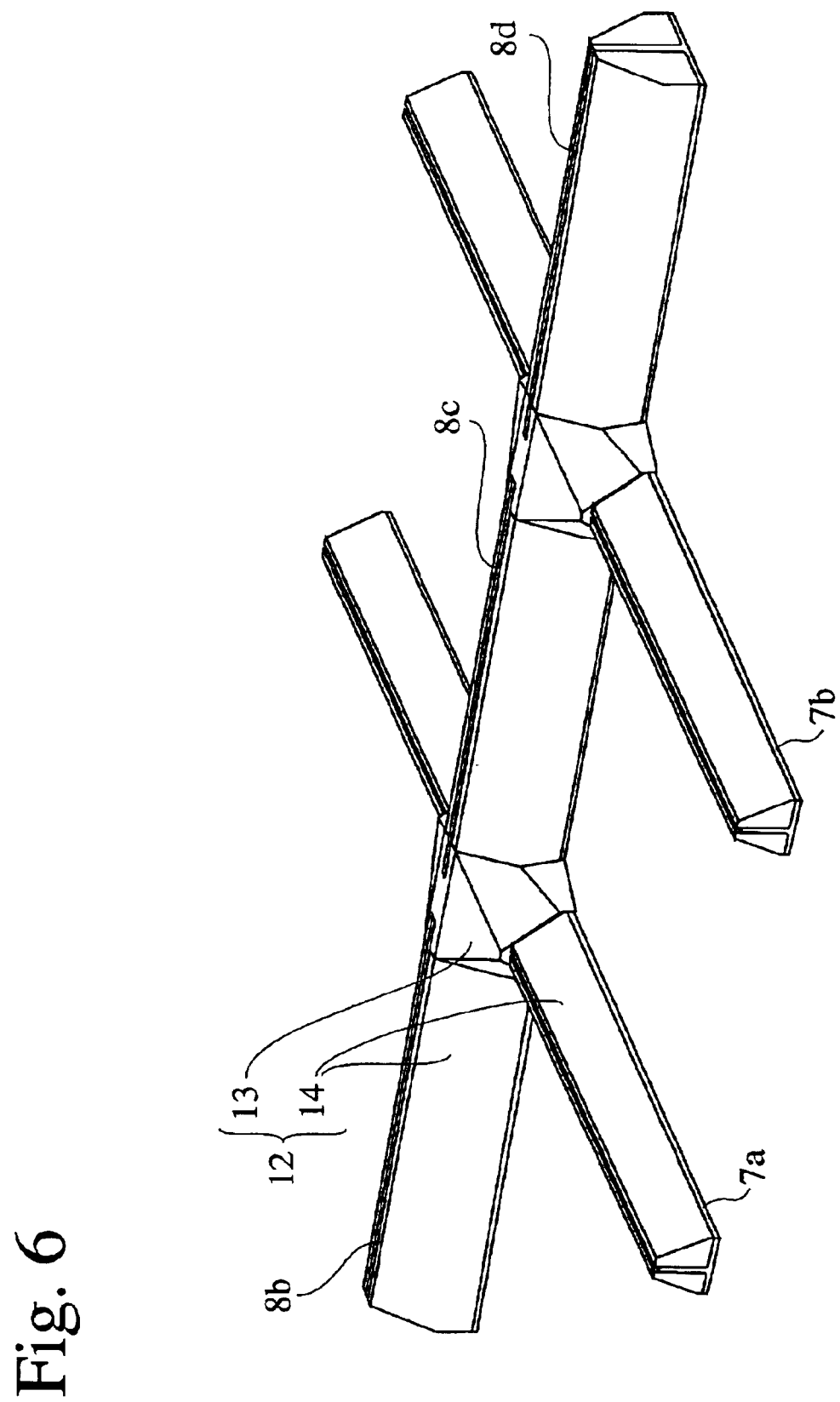
FIG. 6 is a perspective view showing a state where a forming jig comprising a combination of elastic jigs and rigid jigs is provided on the preformed frame members and the preformed stringer members shown in FIG. 4.
Figure 7:
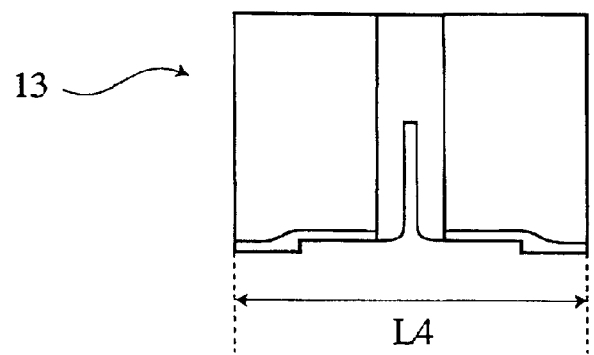
FIG. 7(a) is a sectional view showing an example of an elastic jig which can be preferably used in the present invention.
FIG. 7(b) is a front view showing a state where the elastic jig shown in FIG. 7(a) is engaged with the intersection of preformed frame members and a preformed stringer member, a rigid jig being combined therewith.
Figure 7:
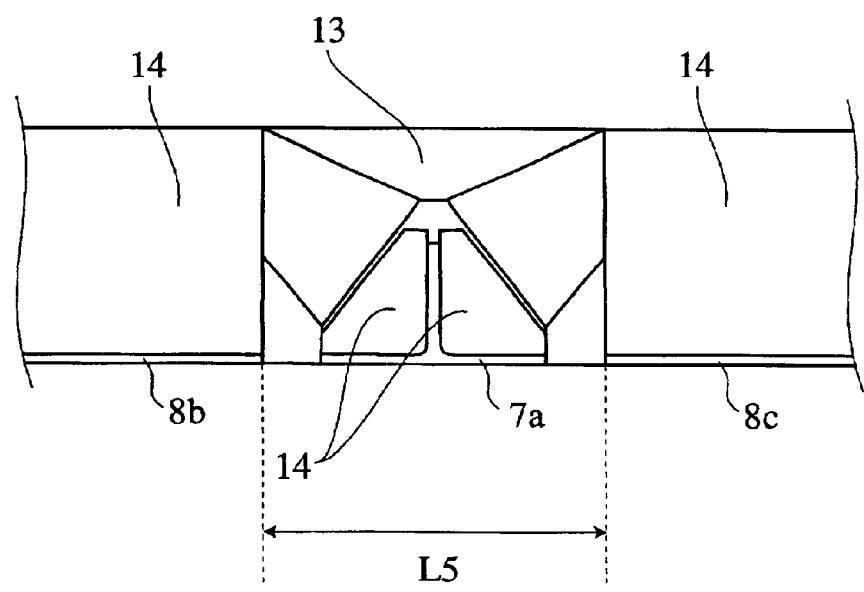

FIG. 6 shows a state where the above-mentioned forming jig 12 comprising a combination of the elastic jigs 13 and the rigid jigs 14 is provided on the preformed stringer members 7a and 7b, and the preformed frame members 8b, 8c and 8d shown in FIG. 4. The elastic jigs 13 are engaged with the intersections of the preformed frame members 8b, 8c and 8d, and the preformed stringer members 7a and 7b. The rigid jigs 14 are attached to the members in portions other than the intersections. Thus, in the present invention, the elastic jig and the rigid jig is preferably used in combination with each other while compensating the disadvantages of each jig. That is, the elastic jig may be used at the intersection having a complicated shape to achieve high dimensional accuracy, while the rigid jigs fix the elastic jig at predetermined positions to achieve high positional accuracy.

The elastic jig may have any shape as long as it can be used in combination with the rigid jigs and can be fitted to the intersection of the preformed stringer member and the preformed frame members. In order to obtain excellent forming accuracy, the width of the elastic jig in the direction of arrangement of the preformed frame member is preferably slightly larger in a free state than when combined with the rigid jigs for the formation of a composite structure. For example, the width L4 of the elastic jig 13 before the forming operation shown in FIG. 7(a) is preferably larger than the width L5 of the elastic jig 13 after the forming operation shown in FIG. 7(b), and specifically, they preferably satisfy the relation of $2\% < [(L4-L5)/L5] \times 100\% < 5\%$. The elastic jig is preferably made of an elastomer having elasticity, heat resistance and releasability, more preferably made of a silicone rubber.

The rigid jig is not critical in shape, it can be in any shape as long as it can maintain the positional accuracy of the composite structure in combination with the elastic jig. The rigid jig is preferably made of a material excellent in dimensional stability, strength and rigidity, and low in thermal expansion. As such a material, there can be mentioned metals such as a steel, a stainless steel and aluminum;

graphite; carbon fiber-reinforced plastics, etc. Among them, aluminum is particularly preferred.

The forming jig mentioned above is preferably used together with two or more fixing means for fixing the preformed stringer member and/or the preformed frame member onto the inner skin. For example, ends of the preformed frame members may be fixed to the inner skin 4 with fixing means 15 as shown in FIG. 8 (rigid jigs, etc. are not shown). The relative positional accuracy of the preformed stringer members and the preformed frame members is secured by using the combination of the elastic jig and the rigid jig, so that mere fixing of the members at ends with the fixing means can secure the entire positional accuracy without a large positioning jig, etc. The fixing mean may be fusion bonding by partial heating using a dryer, a low-temperature solder iron, etc., as well as a mechanical restricting mean such as a screw, a cramp, etc.

Though the present invention has been explained above with reference to the attached drawings, the present invention is not restricted thereto, and any variations and modifications are possible unless the scope and spirit of the present invention are changed.

As described in detail above, in a method of the present invention, a sufficiently lightweight composite structure having a three-dimensionally curved portion and a cylindrical portion can be produced with reduced production cost by simple processes comprising a step of forming a honeycomb sandwich panel and a stiffened panel at the same time. Further, the composite structure can be formed under such a high pressure as approximately 6 kg/cm$^2$, thereby preventing insufficient forming due to pressure shortage. The method of the present invention is very useful for the production of the aircraft body.

What is claimed is:

1. A method for producing a composite structure having a three-dimensionally curved portion and a cylindrical portion, comprising the steps of: (a) placing an outer skin made of a composite prepreg on a forming die; (b) mounting a honeycomb core on a portion of said outer skin that forms said three-dimensionally curved portion; (c) superimposing an inner skin made of a composite prepreg thereon; (d) arranging a preformed frame member and a preformed stringer member each made of a composite prepreg on a portion of said inner skin that forms said cylindrical portion to prepare an assembly; and (e) forming said assembly by heating under a pressure, wherein said assembly is formed by heating under a pressure while disposing an elastic plate and a press plate on a fin portion where said outer skin and said inner skin overlap each other.

2. The method for producing a composite structure according to claim 1, wherein said assembly is formed by heating under a pressure of 6 to 7 kg/cm$^2$.

3. The method for producing a composite structure according to claim 1, wherein a plurality of said preformed frame members are linearly arranged at an interval on said portion of said inner skin that forms said cylindrical portion, one or more of preformed stringer members passing through said interval and intersecting said preformed frame members; and said assembly is formed by heating while using a forming jig comprising a combination of an elastic jig engageable with the intersection of said preformed frame members and said one or more of preformed stringer members, and rigid jigs attachable to said preformed frame members and said one or more of preformed stringer members in portions other than said intersection.

4. The method for producing a composite structure according to claim 1, wherein said composite structure constitutes part of an aircraft body.

* * * * *